United States Patent Office 3,236,798
Patented Feb. 22, 1966

3,236,798
FILM-FORMING ACRYLONITRILE POLYER LA-
TEX AND METHOD FOR PREPARING SAME
William R. Dunnavant, Warrensville Heights, and Ruth A.
Botham, Rocky River, Ohio, assignors to The Standard
Oil Company, Cleveland, Ohio, a corporation of Ohio
No Drawing. Filed Oct. 15, 1962, Ser. No. 230,753
4 Claims. (Cl. 260—29.6)

This invention relates to certain novel film-forming acrylonitrile-acrylate ester polymers and more particularly pertains to aqueous latices of novel polymers of acrylonitrile and lower acrylate esters, said latices being useful in forming films at room temperature or below, to the novel polymers and films themselves and to a method for preparing said latices, films and polymers.

Synthetic copolymers and interpolymers of monomer mixtures comprising acrylonitrile and acrylate esters are well known and some of them have well-established commerical utility. Particularly useful are the high acrylonitrile copolymers containing 80% by weight or more of acrylonitrile and the low acrylonitrile copolymers containing 20% by weight or less of acrylonitrile. The high acrylonitrile copolymers and interpolymers are most generally used in the manufacture of synthetic fibers and the low acrylonitrile copolymers and interpolymers are useful as elastomers. More details concerning the state of the art of the aforementioned acrylonitrile interpolymers may be found, for instance, in U.S. Patents Nos. 2,412,034, 2,558,396, 2,688,608, and 2,958,670, as well as Industrial and Engineering Chemistry, vol. 47, pages 1000 et seq. (1955), vol. 46, pages 1992 et seq. (1954), vol. 43, pages 2500 et seq. (1951), Journal of the American Chemical Society, vol. 65, pages 2067 et seq. (1943), and Rubber Age, February 1953, pages 636–637.

It is well known that it is most difficult and, in many cases, impossible to prepare films at normal temperatures from a latex of a normally crystalline polymer, such as those resulting from the polymerization or copolymerization of high proportions of acrylonitrile as disclosed in U.S. Patent No. 3,047,522.

Interpolymers of acrylonitrile and lower acrylate esters containing about 50% by weight of acrylonitrile are known, but they have somewhat limited utility. In general, such interpolymers do not form useful fibers as the high acrylonitrile polymers do and they are not elastomeric in nature as the low acrylonitrile polymers are. In fact, the acrylonitrile interpolymers containing about 50% acrylonitrile known prior to the present invention do not even form continuous films at room temperature when cast from their aqueous latices.

The textbook, "Vinyl and Related Polymers," by C. A. Schildknecht, published by John Wiley & Sons, New York, 1952, at page 282, and pages 283–284, discloses that many acrylonitrile copolymers have at best only limited utility.

It is also well known that acrylonitrile homopolymer latices (or dispersions) are obtainable only in low solids in the order of about 10 to 15% total solids. (See the text, "Polymeric Materials," by C. C. Windig and G. D. Hiatt, published by the McGraw-Hill Book Co., New York, 1961, particularly page 328.)

In view of the foregoing it would appear to be highly desirable to obtain a latex of a 50:50 by weight polymer of acrylonitrile and a lower acrylate ester which would form a continuous film when cast at about room temperature. Such a film might be expected to have excellent oil and grease resistance because of its high acrylonitrile content. As was mentioned above, it has not been possible to prepare, for instance, a copolymer of 50% by weight acrylonitrile and 50% by weight ethyl acrylate in aqueous latex which would form a continuous film when cast at room temperature. Such a latex would be desirable, for instance, in the formation of a water-based paint useful to the homeowner for painting his interior or exterior walls and other surfaces which he might wish to protect or decorate, and such a latex would be particularly useful for protecting surfaces from oil, grease and many solvents providing it would produce continuous films of good physical properties at or near room temperature.

Accordingly, an object of the present invention is the provision of an aqueous latex of a useful, room temperature film-forming acrylonitrile polymer comprising about 50% by weight of polymerized acrylonitrile. Another object is the provision of a method for preparing the aforementioned latex and polymer.

That the foregoing and other objects have been accomplished by the present invention will become apparent from the following description and illustrative examples, it being understood that many modifications and changes can be made in the products and process disclosed herein by those skilled in the art without departing from the scope of this invention.

We have discovered the process for preparing a stable, useful film-forming polymer latex comprising (a) copolymerizing in an aqueous medium a mixture of from about 70 to 95% by weight of acrylonitrile and from about 30 to 5% by weight of at least one other olefinically unsaturated monomer copolymerizable with acrylonitrile and then (b) polymerizing in the presence of a (a) a monomer comprising a major proportion of a lower acrylate ester so as to produce a final polymeric product containing from about 40 to 60% by weight of polymerized acrylonitrile.

The lower acrylate esters preferred in the present invention are those having the structure $$CH_2=CH—COOR$$

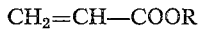

wherein R is an alkyl group having from 2 to 4 carbon atoms. Specific members of the preferred lower acrylate esters include ethyl acrylate, n-propyl acrylate, isopropyl acrylate, n-butyl acrylate and the like.

Other vinyl monomers which are useful in the present invention in minor proportions and preferably in up to about 15% by weight relative to the essential acrylonitrile and lower acrylate ester monomers, include one or more of the following: alpha, beta-olefinically unsaturated carboxylic acids and their anhydrides including acrylic acid, methacrylic acid, alpha-chloro acrylic acid, alpha-bromo acrylic acid, alpha-cyano acrylic acid, maleic acid, maleic anhydride, alpha-chloro maleic acid, dichloromaleic anhydride, itaconic acid, sorbic acid and the like; acrylate esters other than the aforementioned preferred ones, such as methyl acrylate, the amyl acrylates, the hexyl acrylates, the octyl acrylates, cyclohexyl acrylate, phenyl acrylate, and the like; methacrylate esters, such as methyl methacrylate, ethyl methacrylate, the propyl methacrylates, the butyl methacrylates, the hexyl methacrylates, cyclohexyl methacrylate, phenyl methacrylate, the undecyl methacrylates and the like; the vinyl esters, such as vinyl acetate, vinyl propionate, the vinyl butyrates, isopropenyl acetate, isopropenyl propionate, the isopropenyl butyrates and the like; the vinyl ethers, such as methyl vinyl ether, ethyl vinyl ether, the propyl vinyl ethers, the butyl vinyl ethers, the amyl vinyl ethers, the hexyl vinyl ethers, cyclohexyl vinyl ether, phenyl vinyl ether, the heptyl vinyl ethers, the octyl vinyl ethers and the like; the vinyl halides such as vinyl chloride, vinyl fluoride, vinyl bromide, vinylidene chloride, vinylidene bromide, vinylidene fluoride, dichloro-difluoroethylene, chlorotrifluoroethylene, trifluoroethylene, chloroprene, and the like; olefins such as ethylene, propylene, butylenes, amylenes, hexylenes, heptylenes, octylenes, butadiene-1,3, isoprene, styrene, alpha-methyl styrene, alpha-chloro styrene, and the like; vinyl cyanides, such as methacrylonitrile, maleic dinitrile, fumaronitrile, vinylidene cyanide and the like; vinyl amides, such as acrylamide, N-methyl acrylamide, N-methyl methacrylamide, N,N,-dimethyl acrylamide, N,N-dimethyl methacrylamide, N-t-butyl acrylamide, N-dodecyl acrylamide, N-phenyl acrylamide, N-vinyl pyrrolidone, and the like; vinyl amines, such as N-vinyl piperidine, the vinyl pyridines and the like; allyl esters, such as allyl acetate, allyl propionate, allyl butyrate, methallyl butyrate and the like; di- and polyfunctional cross-linking agents, such as ethylene glycol dimethacrylate, ethylene glycol diacrylate, glycerol trimethacrylate, pentaerythritol tetraacrylate, as well as other well-known types of cross-linking agents, such as those disclosed in U.S. Patents Nos. 2,923,692 and 2,985,625.

The most preferred vinyl monomers which optionally may be used alone or together along with the essential acrylonitrile and lower acrylate ester monomers are alpha-chloroacrylonitrile, ethyl alpha-chloroacrylate, styrene, vinyl chloride, vinyl butyl ether, vinylidene chloride, methacrylonitrile, itaconic acid, fumaronitrile, chlorotrifluoro ethylene, vinylidene chloride, vinyl acetate, isobutylene, methyl acrylate, acrylic acid, ethylene dimethacrylate and the like.

The preferred process for preparing a stable, room temperature film-forming polymer latex comprises the two steps of (a) polymerizing in an aqueous medium a mixture of from about 80 to 85% by weight of acrylonitrile and from about 20 to 15% by weight of a major proportion of at least one acrylate ester having the structure.

wherein R is an alkyl group having from 2 to 4 carbon atoms and then (b) polymerizing in the presence of (a) a major proportion of at least one acrylate ester having the structure

wherein R has the foregoing designation so as to produce a final polymeric product having from 45 to 55% by weight of polymerized acrylonitrile.

The step (a) (or backbone) polymer latex of this invention is conveniently prepared in an aqueous medium in the presence of a suitable polymerization catalyst in the range of from about 15 to 60% total solids and preferably at high conversion, i.e., 90% or higher conversion of monomers to polymer. The aqueous medium may be emulsifier-free or it may contain an emulsifier.

Suitable emulsifiers include fatty acid soaps such as sodium laurate; organic sulfates and sulfonates such as sodium lauryl sulfate, the alkali metal salts of sulfonated petroleum or paraffinic oils, the sodium salts of aromatic sulfonic acids such as the sodium salts of naphthalene sulfonic acids, the sodium salts of dodecane-1-sulfonic acid, octadecane-1-sulfonic acid, etc.; aralkyl sulfonates such as sodium isopropyl benzene sulfonate, sodium isobutyl naphthalene sulfonate, and alkali metal salts of polymerized alkyl naphthalene sulfonic acids; alkali metal and ammonium salts of sulfonated dicarboxylic acid esters and amides such as sodium dodecyl sulfosuccinate, sodium N-octadecyl sulfosuccinamate, the polyalkyl and polyalkaryl alkoxylene phosphonate acids and salts more fully described in U.S. Patent No. 2,853,471, and the like; the so-called cationic emulsifiers such as the salts of strong inorganic acids and organic bases containing long carbon chains, for instance, lauryl amine hydrochloride, the hydrochloride of diethylaminoethyl decylamine, trimethyl cetyl ammonium bromide, dodecyl trimethyl ammonium bromide, the diethyl cyclohexylamine salt of cetyl sulfonic ester and others may be used.

In addition to the above and other polar or ionic emulsifiers, still other materials which may be used, singly or in combination with one of more of the above types of emulsifiers include the so-called "nonionic" emulsifiers such as the polyether alcohols prepared by condensing ethylene or propylene oxide with higher alcohols, the fatty alkylamine condensates, the diglycol esters of lauric, oleic and stearic acids, and others. It is often desirable to add post-polymerization emulsifiers to the latices embodied herein for improved stability.

The catalyst, usually required for satisfactory polymerization rate, may be any of those commonly employed for the polymerization of acrylonitrile or acrylate esters including the various peroxygen compounds such as hydrogen peroxide, benzoyl peroxide, pelargonyl peroxide, cumene hydroperoxide, tertiary butyl hydroperoxide, tertiary butyl diperphthalate, tertiary butyl perbenzoate, sodium, potassium and ammonium persulfate and others, such as those disclosed in U.S. Patents Nos. 2,471,959 and 2,491,471.

Particularly preferred as polymerization initiators are the water-soluble peroxygen compounds such as hydrogen peroxide, and the sodium, potassium and ammonium persulfates, the water-soluble oxidation-reduction or "redox" types of catalysts and the heavy metal activated, water-soluble peroxygen and redox catalysts. Included in this preferred list are the water-soluble persulfates; the combination of one of the water-soluble peroxygen compounds such as potassium persulfate with a reducing substance such as a polyhydroxy phenol, an oxidizable sulphur compound such as sodium bisulfite, sodium sulfite and the like; the combination of a water-soluble peroxygen compound such as potassium persulfate and dimethylaminopropionitrile; the combination of a water-soluble peroxygen compound with a reducing sugar or with a combination of a dimercapto compound and a water-soluble ferricyanide compound and others. Heavy metal ions which greatly activate potassium persulfate and the redox catalyzed polymerizations include those of silver, copper, iron, cobalt, nickel and others. The preferred range of catalyst, as above defined, is from about 0.01 to 5 parts by weight per one-hundred parts by weight of monomers.

While the polymerization may be carried out in the presence of air, the rate of reaction is ordinarily faster in the absence of oxygen and hence, polymerization in an evacuated vessel, at reflux, or under an inert atmosphere such as nitrogen or $CO_2$ is preferred. The temperatures at whch the polymerization is carried out is not critical, it may be varied widely from $-30°$ C. to $100°$ C. or higher, though best results are generally obtained at a temperature of from about $0°$ C. to about $70°$ C. Although the pH of the polymerization system is not critical, it is preferred that a pH of about 6 be employed during the polymerization reaction. The final polymer latex may be adjusted to any desired pH. The polymerization may be a batch polymerization or one or more of the components, i.e., monomers, catalyst, activator, emulsifier, water, etc. may be added incrementally or continuously during the polymerization reaction.

Still other substances which desirably may be incorporated into the reaction medium include buffers, electrolyte salts (see "Synthetic Rubber," G. S. Whitby, John Wiley and Sons, Inc., New York, 1954, pp. 226 and 227), carbon black and other pigments and fillers in a manner well understood in the art.

The step (b) part of the present process may be carried out by emulsifying the acrylate monomer component in water, adding the resulting emulsion to the step (a)

latex and then conducting a further polymerization of the acrylate monomer component. This polymerization step may be carried out by any of the procedures described above for the step (a) polymerization. The step (b) polymerization is carried out under conditions such that a stable dispersion is maintained after the addition of the final monomer component. It is preferred that the polymerization of the final monomer component in step (b) is made to occur only after the polymerization of the first step (step (a)) polymer is substantially complete but while the polymer prepared by step (a) is still polymerizable.

The polymers embodied herein resemble graft polymers in some respects and may be graft polymers to some extent although their exact structures cannot be determined. The term "graft polymer" generally designates or refers to a particular type of ordered polymer in which the chains of a given polymer composition are attached at various points to a backbone or base chain of a different polymer composition. Graft polymers are usually prepared by carrying out the polymerization in a stepwise fashion. The first monomeric constituent is polymerized to form the backbone or main polymer chain. After the polymerization of the first monomeric constituent is substantially at an end, but while the polymer formed is in the nascent state, the second monomeric constituent is added and polymerized. The first step polymer is believed to be active, that is polymerizable, even though all of the first monomeric constituent has disappeared. When the second monomer constituent is added, polymerization is thought to be initiated at active centers remaining in the preformed polymer. Thus, the second polymer chain is grafted onto the first.

In the present invention the backbone polymer must be an acryonitrile copolymer or interpolymer and the second step monomer constituent may be a single acrylate ester of the specified type or a mixture of monomers containing a major proportion of the specified acrylate ester as shown in the examples.

Numerous grafting methods, including thermal, ultraviolet light with or without photosensitizer, nuclear radiation, X-ray and catalyst initiated, may be used without significant change in properties of the polymers obtained.

In any event, whatever the nature of their structure, the polymers resulting from the process of this invention are quite different from interpolymers or copolymers of the same compositions or from blends of homopolymers and copolymers possessing similar compositions. Thus, the novel process of the present invention produces polymeric products which differ in kind from, and are in other respects superior to, those of similar chemical composition which have been described previously.

The latices and polymers of this invention are useful, per se, or in conjunction with other materials, such as pigments, fillers, coloring agents and the like for coating, binding and impregnating a multitude of materials.

In the following illustrative examples the amounts of ingredients used are expressed in parts by weight unless otherwise indicated. Minimum film-forming temperatures were determined using a 15 inch long Parr bar constructed of brass having a heating means at one end and a cooling means at the other. The latex was cast upon the bar and the temperature at the various parts along the bar was continuously determined by means of thermocouples. The temperature (minimum) at which an integral film formed was recorded as the minimum film-forming or minimum filming temperature (MFT). For more details regarding minimum filming temperature testing see "Journal of Applied Polymer Science," vol. 4, pp. 81–85 (1960). Descriptions of film properties in general are based on observations of 2.5–3 mil films cast on glass plates, from latex drawn down with a calibrated draw bar and dried at 25° C.

*Example 1*

Among the latices described in this example only one, Latex E, is within the scope of the present invention.

Latex A was prepared by polymerizing the following ingredients with stirring under a nitrogen atmosphere for 2.7 hours at a temperature of about 60° C.

| | Parts |
|---|---|
| Acryonitrile | 50.0 |
| Ethyl acrylate | 8.8 |
| Distilled water | 88.0 |
| Gafac RE–610 * | 1.38 |
| Daxad 11 ** | 0.059 |
| Potassium persulfate | 0.168 |
| Sodium bisulfite | 0.084 |

\* Which is a mixture of $R-O-(CH_2CH_2O-)_nPO_3M_2$ and $[R-O-(CH_2CH_2O-)_n]_2PO_2M$ wherein $n$ is a number of from 1 to 40, R is an alkyl or alkaryl group and preferably a nonyl phenyl group and M is hydrogen, ammonia or an alkali metal which composition is sold by the General Aniline and Film Corp.
\*\* Which is a sodium salt of a polymerized alkyl naphthalene sulfonic acid sold by the Dewey and Almy Chemical Co.

The pH of the foregoing mixture was adjusted to about 6 with ammonium hydroxide prior to the start of the polymerization reaction. The reaction product was a stable polymer of 39.8% total solids which resulted from the quantitative (99.5%) conversion of monomers to polymer.

Latex B was prepared by the procedure outlined for Latex A above employing the following polymerization mixture:

| | Parts |
|---|---|
| Ethyl acrylate | 41.2 |
| Distilled water | 42.0 |
| Gafac RE–610 | 0.97 |
| Daxad 11 | 0.04 |
| Potassium persulfate | 0.168 |
| Sodium bisulfite | 0.084 |

A stable latex was obtained having 49.2% total solids indicating a conversion of 98.5% of monomer to polymer.

Latex C was prepared by the procedure given for Latex A above except that a polymerization temperature of 55° C., a reaction time of 3 hours and the following ingredients were used:

| | Parts |
|---|---|
| Acrylonitrile | 50 |
| Ethyl acrylate | 50 |
| Distilled water | 108 |
| Gafac RE–610 | 2.3 |
| Potassium persulfate | 0.168 |
| Sodium bisulfite | 0.084 |

A stable, 44% total solids latex resulted from the conversion of 99% of the monomer to polymer.

Latex D was prepared by blending some of Latex A with some of Latex B to produce a blend containing about 50% by weight of polymerized acrylonitrile and having 44% total solids.

Latex E, which is the only latex in this example which is within the scope of the present invention, was prepared by adding the following emulsified mixture to Latex A and stirring the resulting mixture for an hour under a nitrogen atmosphere at 65–70° C.

| | Parts |
|---|---|
| Ethyl acrylate | 41.2 |
| Distilled water | 41.2 |
| Gafac RE–610 | 0.97 |
| Daxad 11 | 0.04 |

There resulted a stable, coagulum-free polymer latex containing 44% total solids which represents essentially total conversion of ethyl acrylate to polymer.

The minimum film-forming temperature of each of the foregoing latices was determined and some of the properties of the films which formed as low as 25° C. were observed. Latex A did not form a film under the test conditions. Latex C formed a film at about 33–34° C. and not below, but the film was brittle and weak. A 2.5 to 3 mil film of Latex C prepared on glass at 33–34° C. could not be stripped in one piece from the glass because of its brittleness and lack of strength and elongation. Dried polymer from Latex C was found to be completely soluble in dimethyl formamide. Latex D formed a film below 10° C. but a 2.5 to 3 mil film formed on glass at 25° C., was opaque (white) and it was so brittle and weak that it could not be stripped from the glass in one piece. This film had no measurable tensile and no apparent elongation. Latex E formed a film at a temperature below 10° C. and a 2.5 to 3 mil film formed from the latex at 25° C. on glass under the same conditions as those for Latex D above was clear, colorless, self-supporting, (could be stripped in one piece from the glass) having a tensile of 250–750 p.s.i. and an elongation of from 450–1000%. Dried polymer from Latex E was found to be insoluble in dimethyl formamide.

Latex E was compounded into latex paints having 25, 30 and 40% pigment volume concentrations. All of the paints were found to have excellent properties when evaluated according to Federal Specifications TT–P–0029 and TT–P–141b.

Similarly, Latex E was found to be an excellent clear, unmodified coating for paper and paper board giving coated products having excellent gloss, color, color stability, grease resistance, water resistance, flexibility, resistance to blocking and leveling properties in this application.

Results which were essentially the same as those described above were obtained when sodium lauryl sulfate was used in place of the combination of Gafac RE–610 and Daxad 11.

*Example II*

The following mixture was polymerized for 20.5 hours at 50° C. with stirring and under a nitrogen atmosphere to produce a stable latex having 18.5% total solids representing a 98.5% conversion of monomer to polymer.

|  | Parts |
|---|---|
| Acrylonitrile | 49.0 |
| n-Butyl acrylate | 8.8 |
| Distilled water | 265.0 |
| Sodium lauryl sulfate | 2.11 |
| Sodium bisulfite | 0.059 |
| Potassium persulfate | 0.11 |

To the resulting latex was added the following emulsified mixture:

|  | Parts |
|---|---|
| n-Butyl acrylate | 41.2 |
| Distilled water | 186.0 |
| Sodium lauryl sulfate | 1.45 |
| Daxad 11 | 0.039 |

The resulting mixture was polymerized for one hour at 65–80° C. to produce a stable, 18.4% total solids latex representing a total conversion of 97% of monomer to polymer. This latex had a minimum film-forming temperature of less than 10° C. and it formed, when cast on glass at 25° C., a colorless, clear film of 2.5 to 3 mil thickness which could be stripped in one piece from the glass support.

When the foregoing procedure was repeated, using methyl acrylate in place of n-butyl acrylate in both steps, a final latex was obtained which formed on glass at 25° C. a brittle film of 2.5 to 3 mil thickness which had no strength and could not be stripped from the glass in one piece.

A copolymer latex of 50 parts acrylonitrile and 50 parts n-butyl acrylate prepared in a manner similar to that given for Latex C in Example I had a minimum film-forming temperature of 32° C. and would not form a continuous film of 2.5 to 3 mil thickness on glass at 25° C.

*Example III*

The following ingredients were stirred for 1.5 hours at 60° C. under a nitrogen atmosphere at an initial pH of 6.5 to produce a stable latex having a 40% total solids content.

|  | Parts |
|---|---|
| Acrylonitrile | 50.0 |
| Ethyl acrylate | 8.8 |
| Alpha-chloroacrylonitrile | 1.76 |
| Distilled water | 88.0 |
| Gafac RE–610 | 1.38 |
| Daxad 11 | 0.057 |
| Potassium persulfate | 0.168 |
| Sodium bisulfite | 0.084 |

To the resulting latex was added the following emulsified mixture:

|  | Parts |
|---|---|
| Ethyl acrylate | 41.2 |
| Distilled water | 41.2 |
| Gafac Re–610 | 1.07 |
| Daxad 11 | 0.042 |
| Anthraquinone β-sulfonic acid | 0.168 |
| Ascorbic acid | 0.084 |

The resulting mixture was sitrred for one hour at 32–55° C. while being irradiated by ultraviolet light (two General Electric sunlamps). A stable latex having 45.5% total solids, representing essentially 100% conversion of monomer to polymer, was obtained. The latex had a minimum film-forming temperature of less than 10° C. and a 2.5 to 3 mil film cast from this latex onto a glass plate at 25° C. was clear, self-supporting and flexible with good elongation.

Similar results were obtained when the alpha-chloroacrylonitrile of the foregoing procedure was replaced with 2.94 parts of vinylidene chloride.

*Example IV*

The following ingredients were stirred for 18 hours at 60° C. under a nitrogen atmosphere to produce a stable, 36% total solids latex representing 96% conversion.

|  | Parts |
|---|---|
| Acrylonitrile | 50.0 |
| Methyl acrylate | 8.8 |
| Distilled water | 100.2 |
| Gafac RE–610 | 1.38 |
| Daxad 11 | 0.059 |
| Potassium persulfate | 0.168 |
| Sodium bisulfite | 0.084 |

To the above latex was added the following emulsified mixture:

|  | Parts |
|---|---|
| Ethyl acrylate | 41.2 |
| Distilled water | 41.2 |
| Gafac RE–610 | 0.97 |

The resulting stable polymer latex-emulsified monomer mixture was stirred under nitrogen at 65–70° C. for 1 hour to form a stable latex having 40% total solids and a minimum film-forming temperature of less than 25° C.

Similar results were obtained when 0.04 part of ethylene dimethacrylate was included with the ethyl acrylate monomer of the second step shown above.

Similar results were obtained when 0.006 part of potassium persulfate was included in the monomer emulsion of the second step shown above.

Similar results were obtained when the 41.2 parts of ethyl acrylate in the second step shown above was replaced by a mixture of 37.08 parts of ethyl acrylate and 4.12 parts of t-butyl acrylate and 0.02 part of sodium bisulfite was included in the second step mixture.

Similar results were obtained when the 41.2 parts of ethyl acrylate in the second step shown above was replaced by a mixture of 37.08 parts of ethyl acrylate and 4.12 parts of vinyl acetate and 0.02 part of sodium bisulfite was included in the second step mixture.

Similar results were obtained when the 41.2 parts of ethyl acrylate in the second step shown above was replaced by a mixture of 37.08 parts of ethyl acrylate and 4.12 parts of vinylidene chloride and 0.02 part of sodium bisulfite was included in the second step mixture.

Similar results were obtained when the 41.2 parts of ethyl acrylate in the second step shown above was replaced by a mixture of 37.08 parts of ethyl acrylate and 4.12 parts of vinyl butyl ether.

Similar results were obtained when the 41.2 parts of ethyl acrylate in the second step shown above was replaced by a mixture of 37.08 parts of ethyl acrylate and 4.12 parts of methyl acrylate.

*Example V*

The following mixture of ingredients was stirred for 18 hours at 60° C. under a nitrogen atmosphere to produce a stable 36% total solids latex representing 96% conversion.

| | Parts |
|---|---|
| Acrylonitrile | 50.0 |
| Ethyl vinyl ether | 8.8 |
| Distilled water | 100.2 |
| Gafac RE-610 | 1.38 |
| Daxad 11 | 0.059 |
| Potassium persulfate | 0.168 |
| Sodium bisulfite | 0.084 |

To the resulting polymer latex was added the following emulsified mixture:

| | Parts |
|---|---|
| Ethyl acrylate | 41.2 |
| Distilled water | 41.2 |
| Gafac RE-610 | 0.97 |

The resulting stable polymer latex-monomer mixture was stirred under nitrogen at 65-70° C. for 60 minutes to form a stable latex containing 40% total solids and having a minimum film-forming temperature of less than 25° C. Films formed on glass at 25° C. from this latex had excellent physical properties and were clear and colorless.

Similar results were obtained when vinyl acetate was substituted for the ethyl vinyl ether in the first step shown above.

All of the films of the polymers of this and the preceding examples which are within the scope of the present invention had excellent oil resistance as determined by the TAPPI T454-M60 test, they all showed little color change after 200 hours exposure in the Atlas Weatherometer and they all had good scrubability properties.

We claim:
1. The process for preparing a stable latex of a film-forming polymer comprising
    (a) polymerizing in an aqueous medium a monomeric constituent containing from 70 to 95% of acrylonitrile and from 30 to 5% by weight of at least one other olefinically unsaturated monomer copolymerizable with acrylonitrile and then
    (b) polymerizing in admixture with the polymer resulting from (a) a monomeric constituent comprising a major proportion of at least one monomer having the structure $CH_2=CHCOOR$ wherein R is an alkyl group having from 2 to 4 carbon atoms to produce a final polymeric product containing from about 40 to 60% by weight of polymerized acrylonitrile.
2. The process for preparing a stable latex of a polymer having a minimum film-forming temperature no greater than 25° C. comprising
    (a) polymerizing in an aqueous medium a monomer constituent containing from about 80 to 85% by weight of acrylonitrile and from about 20 to 15% by weight of a major proportion of at least one acrylate ester having the structure $CH_2=CHCOOR$ wherein R is an alkyl group having from 2 to 4 carbon atoms and then
    (b) polymerizing in admixture with the polymer resulting from (a) a major proportion of at least one acrylate ester having the structure $CH_2=CHCOOR$ wherein R has the foregoing designation to produce a final polymeric product having from 45 to 55% by weight of polymerized acrylonitrile.
3. The process of claim 2 wherein R is ethyl.
4. The process of claim 2 wherein R is n-butyl.

References Cited by the Examiner
UNITED STATES PATENTS

| 2,412,034 | 12/1946 | D'Alelio | 260—85.5 |
| 2,436,204 | 2/1948 | D'Alelio | 260—85.5 |
| 2,777,832 | 1/1957 | Mallison | 260—881 |

MURRAY TILLMAN, *Primary Examiner.*